US012763599B2

(12) United States Patent
Lee

(10) Patent No.: US 12,763,599 B2
(45) **Date of Patent: *Oct. 13, 2026**

(54) BATTERY SWAPPING STATION HAVING MODE IN WHICH BATTERY PACK IS OPERATED AT TIME OF POWER SUPPLY INTERRUPTION

(71) Applicant: LG ENERGY SOLUTION, LTD., Seoul (KR)

(72) Inventor: Sung Gun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/019,119

(22) Filed: Jan. 13, 2025

(65) Prior Publication Data

US 2025/0149912 A1 May 8, 2025

Related U.S. Application Data

(63) Continuation of application No. 18/024,135, filed as application No. PCT/KR2022/011376 on Aug. 2, 2022, now Pat. No. 12,218,544.

(30) Foreign Application Priority Data

Sep. 9, 2021 (KR) ........................ 10-2021-0120592

(51) Int. Cl.
*H02J 9/06* (2006.01)
*H02J 3/32* (2006.01)
(Continued)

(52) U.S. Cl.
CPC ................ *H02J 9/061* (2013.01); *H02J 3/32* (2013.01); *H02J 7/40* (2026.01); *B60L 53/80* (2019.02); *B60L 55/00* (2019.02)

(58) Field of Classification Search
CPC ...... H02J 9/061; H02J 3/32; H02J 7/40; H02J 7/44; H02J 7/50; B60L 53/80;
(Continued)

(56) References Cited

U.S. PATENT DOCUMENTS 12,218,544 B2 * 2/2025 Lee ..................... H02J 7/00036
2010/0141206 A1 6/2010 Agassi et al.
(Continued)

FOREIGN PATENT DOCUMENTS

CN 112918291 A 6/2021
JP 2006-202660 A 8/2006
(Continued)

*Primary Examiner* — Richard Tan
(74) *Attorney, Agent, or Firm* — Birch, Stewart, Kolasch & Birch, LLP

(57) ABSTRACT

A battery-pack-based battery swapping station may include an external power grid configured to supply power, at least one charger configured to charge a battery pack, a controller configured to perform control such that the power supplied from the external power grid is transmitted to the battery pack and the battery pack is charged with the power, a main power source configured to supply power to the controller, a first bidirectional direct-current to direct-current (DC/DC) converter, the first DC/DC converter being configured to supply direct-current power to the battery pack, a second DC/DC converter, and an alternating-current to direct-current (AC/DC) converter connected to the external power grid, the AC/DC converter being configured to convert current. In addition, the controller may include a main control unit (MCU) is located between the AC/DC converter and the first DC/DC converter, the MCU being configured to generate a control signal.

16 Claims, 2 Drawing Sheets

(51) Int. Cl.

| | |
|---|---|
| ***H02J 7/40*** | (2026.01) |
| *B60L 53/80* | (2019.01) |
| *B60L 55/00* | (2019.01) |

(58) Field of Classification Search

CPC ...... B60L 55/00; B60L 53/68; B60L 2210/10; B60L 2210/30; B60L 2210/40; B60L 53/24; B60L 53/53; Y02T 10/70; Y02T 10/7072

USPC ............................................................ 307/23

See application file for complete search history.

(56) References Cited

U.S. PATENT DOCUMENTS

| | | | | |
|---|---|---|---|---|
| 2013/0200846 | A1* | 8/2013 | Ang ........................ | B60L 1/003 320/109 |
| 2014/0012448 | A1 | 1/2014 | Tripathi et al. | |
| 2014/0203632 | A1 | 7/2014 | Kouno et al. | |
| 2015/0183332 | A1 | 7/2015 | Yun et al. | |
| 2017/0174093 | A1 | 6/2017 | Oettle et al. | |
| 2019/0299942 | A1 | 10/2019 | Shih et al. | |
| 2022/0126696 | A1 | 4/2022 | Jeannard | |
| 2022/0329091 | A1 | 10/2022 | Takemura et al. | |

FOREIGN PATENT DOCUMENTS

| | | | |
|---|---|---|---|
| JP | 2013-81290 | A | 5/2013 |
| JP | 2013-90459 | A | 5/2013 |
| JP | 2015-27135 | A | 2/2015 |
| JP | 5872494 | B2 | 3/2016 |
| JP | 2017-527246 | A | 9/2017 |
| JP | 6331112 | B2 | 5/2018 |
| JP | WO2019/073652 | A1 | 4/2019 |
| JP | 2019-176725 | A | 10/2019 |
| KR | 10-2014-0081311 | A | 7/2014 |
| KR | 10-1418181 | B1 | 7/2014 |
| KR | 10-2015-0035794 | A | 4/2015 |
| KR | 10-1528079 | B1 | 6/2015 |
| KR | 10-2019-0048000 | A | 5/2019 |
| KR | 10-2020-0053734 | A | 5/2020 |
| KR | 10-2021-0075160 | A | 6/2021 |
| WO | WO 2013/179358 | A1 | 12/2013 |

* cited by examiner

【FIG. 1】
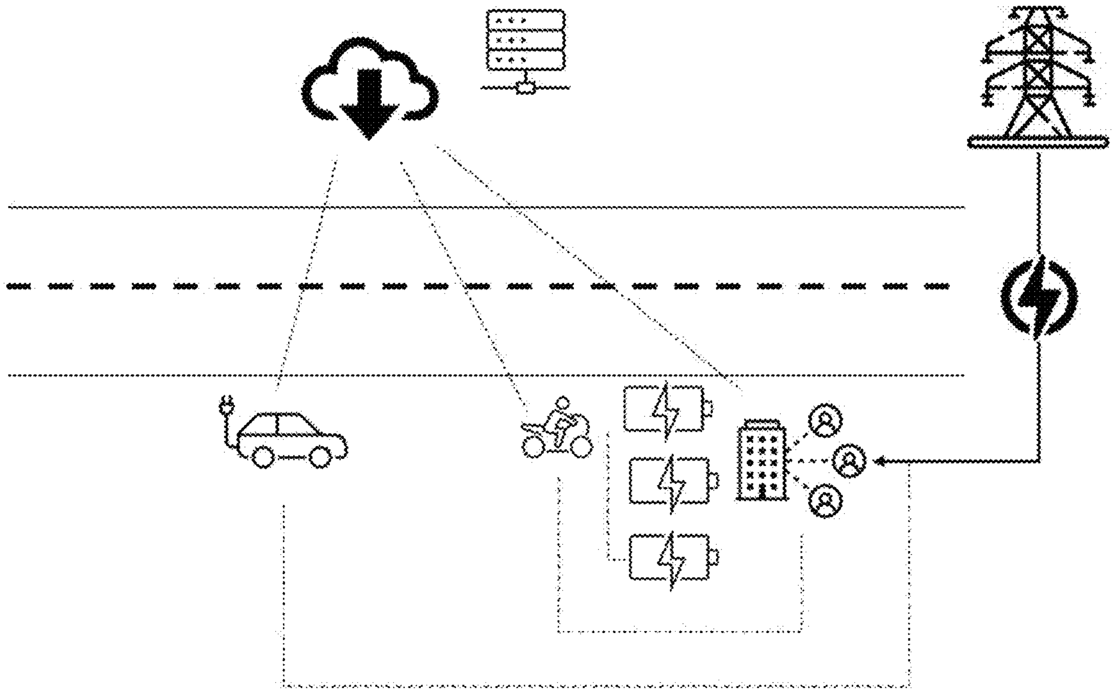
【FIG. 2】
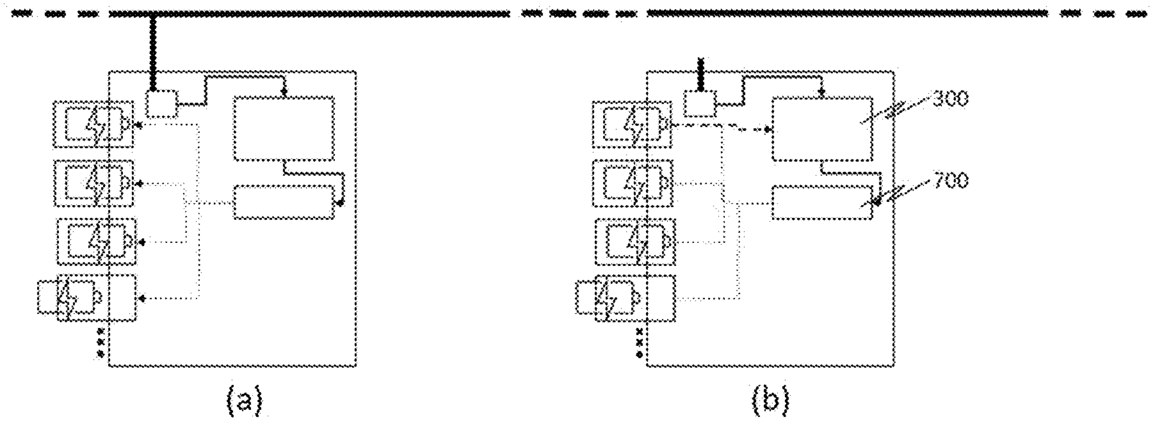

【FIG. 3】
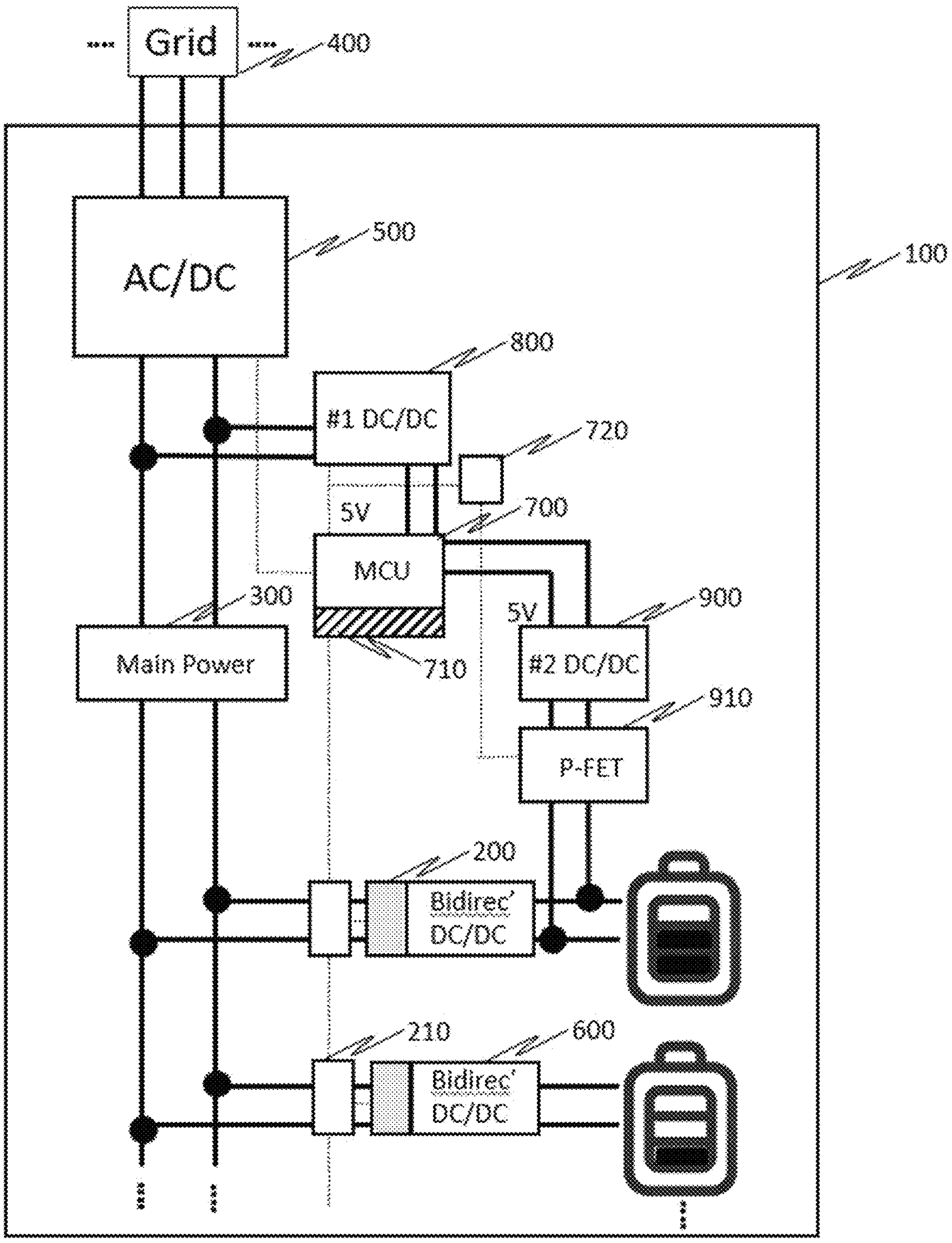

BATTERY SWAPPING STATION HAVING MODE IN WHICH BATTERY PACK IS OPERATED AT TIME OF POWER SUPPLY INTERRUPTION

CROSS-REFERENCE TO RELATED APPLICATIONS

This application is a Continuation of U.S. application Ser. No. 18/024,135, filed on Mar. 1, 2023, which is the National Phase under 35 U.S.C. § 371 of International Application No. PCT/KR2022/011376, filed on Aug. 2, 2022, which claims priority under 35 U.S.C. § 119 to Korean Patent Application No. 10-2021-0120592, filed in the Republic of Korea on Sep. 9, 2021, the disclosures of all these applications being hereby incorporated by reference in their entireties into the present application.

BACKGROUND

Technical Field

The present invention relates to a battery swapping station having a mode in which a battery pack is operated at the time of power supply interruption. More particularly, the present invention relates to a battery swapping station having a mode in which a battery pack is operated at the time of power supply interruption that is capable of, when the supply of power to a battery swapping station (BSS) configured to charge a swappable battery is interrupted due to power failure or system error, enabling the BSS system to be operated without interruption.

Discussion of the Background Art

With movement to replace an internal combustion engine of a vehicle with an electric motor, much research on a method of supplying electricity, which is a resource of the electric motor, to the vehicle has been conducted. Typically, a scheme in which an electric battery is disposed in the vehicle and the electric motor uses electricity stored in the electric battery has been proposed.

Meanwhile, a scheme in which a battery of a vehicle is swapped to supply electrical energy to the vehicle, instead of charging the battery of the vehicle, due to the reason that time necessary to charge the battery is longer than time necessary to fill a vehicle using a conventional internal combustion engine with fuel has been proposed.

Conventionally, power generated by a fossil fuel power generation source and a renewable energy power generation source of a system is supplied to a load and a battery swapping station. The power is supplied from the system to a load and a consumer through unidirectional power transmission.

The battery swapping station, which is a place at which a battery of an electric vehicle driven by electrical energy is swapped, includes a plurality of batteries capable of being swapped with the battery of the electric vehicle, and the battery is charged with power supplied from the system.

The battery provided in the battery swapping station is a battery for electric vehicles, which cannot store a large amount of power. Meanwhile, renewable energy power generation, such as fuel cell power generation, wind power generation, and photovoltaic power generation, is included in the system so as to supply generated power to the system. However, renewable energy power generation, such as wind power generation and photovoltaic power generation, is greatly affected by weather, whereby it is difficult to uniformly and continuously supply power to a load, and therefore usability is greatly reduced. In particular, for fuel cell power generation, when the system or a load is abnormal, whereby linkage is interrupted, it is not possible to maintain power generation, since power generation is possible only in a state of being linked to the load.

Such limitations lead to a limitation in operation of the system and the battery swapping station. Since the supply of power to the battery swapping station is achieved based on system linkage through an external power source using a smart grid, therefore, there is a limitation in stable operation of the battery swapping station in case of emergency, such as electrical disconnection from an external system.

In addition, since the battery included in the battery swapping station cannot be charged with a large amount of power, appropriate supply of power is difficult using only available power of the battery when the supply of power to the system is necessary.

Korean Registered Patent Publication No. 1528079 discloses a battery exchange station and a method of operating the battery exchange station, wherein a large-capacity battery is charged with power supplied from a system, the energy stored in the large-capacity battery is supplied to the system depending on the operation state of the system, whereby it is possible to improve operation of the system and electricity demand using the energy stored in the battery. However, technology related to operation of a battery swapping station in case of emergency, e.g., at the time of electrical disconnection from the system, is not disclosed.

Korean Patent Application Publication No. 2021-0075160 discloses a power supply control system including a first power control device including two input units and at least two output units and a second power control device including two input units and at least two output units, wherein each of the power control devices is configured to be operated in an active mode or an insulation mode, the input units and the output units of the power control device are electrically connected to each other in the active mode, the input units and the output units of the power control device are electrically insulated from each other in the insulation mode, one of the power control devices is operated in the active mode, and the other power control device is operated in the insulation mode. However, technology related to a battery swapping station that is capable of being stably operated at the time of abnormal supply of power due to electrical disconnection, as in the present invention, is not disclosed.

Korean Registered Patent Publication No. 1418181 discloses an energy storage system configured such that a user directly controls charging or discharging of a battery pack when a mode switching button is switched on, a microcomputer provided in the energy storage system determines whether power failure has occurred and the state of the battery pack to control charging or discharging of the battery pack when the mode switching button is switched off. However, technology related to a battery swapping station is not disclosed.

Japanese Registered Patent Publication No. 5872494 discloses technology related to a power conversion apparatus for vehicles having a level converter and a resistor configured to prevent discharge of a protection circuit for overvoltage inhibition. However, technology related to a battery swapping station is not disclosed.

Consequently, there is a need to propose a battery-pack-based battery swapping station capable of improving operation between a system and the battery swapping station by solving the above limitations in an emergency situation in which the supply of power necessary to achieve various functions and effects of a smart grid is impossible at the time when a UPS configured to supply power to a load in an uninterrupted state, an electric vehicle, charging of the electric vehicle using a battery, bidirectional power transaction between a supplier who utilizes available power or surplus power and a consumer, and renewable energy power generation are emphasized as the result of replacing a conventional power grid with the smart grid.

DOCUMENTS (Patent Document 1) Korean Registered Patent Publication No. 1528079

(Patent Document 2) Korean Patent Application Publication No. 2021-0075160

(Patent Document 3) Korean Registered Patent Publication No. 1418181

(Patent Document 4) Japanese Registered Patent Publication No. 5872494

SUMMARY OF THE DISCLOSURE

The present invention has been made in view of the above problems, and it is an object of the present invention to provide a battery swapping station having a mode in which a battery pack is operated at the time of power supply interruption that is capable of, when the supply of power to a battery swapping station (BSS) configured to charge a swappable battery is interrupted due to power failure or system error, enabling the BSS system to be operated without interruption.

A battery-pack-based battery swapping station according to the present invention to accomplish the above object includes an external power grid configured to supply power, at least one charger configured to charge a battery pack, a controller configured to perform control such that the power supplied from the external power grid is transmitted to the battery pack via a system and the battery pack is charged with the power, and a main power source configured to supply power to the charger and the controller, wherein the controller determines an operation state of the system and, when supply of power from the external power grid is impossible, performs control such that the power stored in the battery pack is supplied to the main power source.

The charger may include at least one bidirectional DC/DC converter disposed in a housing, the bidirectional DC/DC converter being configured to supply direct-current power to the at least one battery pack.

In addition, the battery-pack-based battery swapping station may include an AC/DC converter connected to the external power grid, the AC/DC converter being configured to convert current.

The controller may include a main control unit (MCU) formed between the AC/DC converter and the bidirectional DC/DC converter, the MCU being configured to generate a control signal, and a controller power source for driving.

In addition, the battery-pack-based battery swapping station may include a first DC/DC converter formed between the AC/DC converter and the MCU.

In addition, the battery-pack-based battery swapping station may include a second DC/DC converter formed between the MCU and the bidirectional DC/DC converter and the battery pack.

When supply of power from the external power grid is interrupted, the MCU may operate the second DC/DC converter to change a current direction of the bidirectional DC/DC converter from the battery pack to the main power source.

In addition, the controller may include a voltage sensing unit configured to determine whether voltage between the first DC/DC converter and the MCU is abnormal.

In addition, the battery-pack-based battery swapping station may include a p-channel field-effect transistor (P-FET) formed between the second DC/DC converter and the bidirectional DC/DC converter and the battery pack, wherein, when a value of voltage sensed by the voltage sensing unit is 0 V, the controller may perform control such that the P-FET is turned on, whereby the second DC/DC converter is operated to change the current direction of the bidirectional DC/DC converter from the battery pack to the main power source.

In addition, the present invention provides an electrically driven device including a receiving unit configured to receive identification information of the battery-pack-based battery swapping station and a processor configured to determine whether to communicate with the battery-pack-based battery swapping station based on the identification information received from the battery-pack-based battery swapping station and authentication information.

It is obvious that the type of the electrically driven device is not restricted as long as the electrically driven device is a device that secures driving power using a battery pack. Preferably, the electrically driven device is an electric vehicle, an electric motorcycle, or an electric cart.

As is apparent from the above description, a battery-pack-based battery swapping station has an effect in that it is possible to stably maintain the operation of a battery pack even in an emergency situation in which the supply of power is interrupted.

In addition, the battery swapping station has an effect in that it is possible to maintain stable communication and swapping between an electric vehicle and the battery swapping station, whereby it is possible to maintain communication between the electric vehicle and the battery swapping station.

In addition, the battery swapping station has an effect in that a battery is charged with power and the power is resupplied to the battery swapping station, whereby it is possible to utilize the energy stored in the battery.

In addition, the battery swapping station has an effect in that it is possible to supply the energy stored in the battery to the battery swapping station when the operation of the system is changed, whereby it is possible to improve the operation of the system and electricity demand.

In addition, the battery swapping station has an effect in that power swapping is achieved between a system configured to supply power using the battery that stores power, a moving means configured to be charged with the power, and the station, whereby bidirectional supply of power between linked devices or systems is possible.

BRIEF DESCRIPTION OF THE DRAWINGS

FIG. 1 is a conceptual view showing the operation of a battery swapping station for vehicles each driven by a battery pack.

FIG. 2 is a view schematically showing the operation of a battery-pack-based battery swapping station according to an embodiment of the present invention when external power is normally supplied to the battery swapping station and when the supply of external power to the battery swapping station is interrupted.

FIG. 3 is a view showing a battery-pack-based battery swapping station in which power management is reflected when the supply of external power is interrupted according to the embodiment of the present invention.

DETAILED DESCRIPTION OF THE EMBODIMENTS

Now, preferred embodiments of the present invention will be described in detail with reference to the accompanying drawings such that the preferred embodiments of the present invention can be easily implemented by a person having ordinary skill in the art to which the present invention pertains.

In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations.

In the case in which one part is said to be connected to another part throughout the specification, not only may the one part be directly connected to the other part, but also, the one part may be indirectly connected to the other part via a further part.

In addition, that a certain element is included does not mean that other elements are excluded, but means that such elements may be further included unless mentioned otherwise.

Hereinafter, the present invention will be described in detail.

FIG. 1 is a conceptual view showing the operation of a battery swapping station for vehicles each driven by a battery pack.

A battery swapping system for electric vehicles according to an embodiment includes a server, a battery swapping station, and an electric vehicle. The server may be an integrated control center. It is obvious that the kind of the electric vehicle is not restricted as long as the electric vehicle is an electrically driven device configured to be driven by an electric motor using current stored in an electric battery.

In the battery swapping system according to the embodiment, the server transmits information of a battery swapping station at which the electric vehicle can swap the battery to the electric vehicle. The electric vehicle performs battery swapping at a battery swapping station coinciding with the information of the battery swapping station received from the server. Hereinafter, a battery swapping station specified by the server as a station at which the electric vehicle will swap the battery is defined as a target battery swapping station. The server may set a station selected by a user of the electric vehicle as the target battery swapping station. Alternatively, the server may set a station closest to the electric vehicle as the target battery swapping station.

An external power source may have a power system line connected to the battery swapping station by wire. A power source configured to supply power to a power grid may be a conventional power generation source, preferably a renewable energy power generation source.

Referring to FIG. 1, in the battery swapping system, the server and the electric vehicle may communicate with each other using a wireless communication method as a communication method between respective objects. The server and the electric vehicle may communicate with each other using a wireless telecommunication method over a mobile communication network, such as 5G or LTE.

The server and the battery swapping station may communicate with each other using a wireless communication method, such as a wireless telecommunication method, or a wired communication method.

The battery swapping station and the electric vehicle may communicate with each other using a wireless communication method.

The battery swapping station includes a plurality of batteries constituted by a large-capacity battery for power storage only and a battery for swapping compatible with a battery of a moving means and a control unit MCU configured to control charging and discharging of the plurality of batteries such that the plurality of batteries is charged with power supplied from the system and such that the energy stored in the plurality of batteries is supplied to the system depending on the operation state of the system.

In an embodiment, each of the plurality of batteries may be a secondary battery, which is capable of being charged and discharged. The large-capacity battery may be any one of a redox flow battery, a NaS battery, and a compressed air energy storage (CAES) system, and the battery for swapping may be any one of a lithium-ion battery, a metal-air battery, and an Na-based battery.

When swapped with the battery for swapping, the battery of the moving means may be charged with power supplied from the system. The battery of the moving means may be charged with the energy stored in the plurality of batteries. In an embodiment, the battery of the moving means may be charged with power from the system, and the energy stored in the battery of the moving means may be supplied to the plurality of batteries and the system.

A power conversion apparatus configured to convert energy stored in the plurality of batteries by charging and power discharged from the plurality of batteries may be further included. In an embodiment, the power conversion apparatus may include a converter configured to convert AC power into DC power, an inverter configured to convert DC power into AC power, a switch, and a transformer configured to change the magnitude of voltage.

FIG. 2 is a view schematically showing the operation of a battery-pack-based battery swapping station according to an embodiment of the present invention when external power is normally supplied to the battery swapping station and when the supply of external power to the battery swapping station is interrupted.

Particularly, (a) of FIG. 2 is a view showing the situation in which power from an external power grid is normally supplied to the battery swapping station, and (b) of FIG. 2 is a view showing the situation in which power from the external power grid is not supplied to the battery swapping station.

When the supply of external power is interrupted, whereby there is no power in the system of the battery swapping station, as shown in (b), the MCU may supply power from at least one battery pack to the battery swapping station, as indicated by a dotted line.

The battery-pack-based battery swapping station may include an external power grid configured to supply power, at least one charger configured to charge at least one battery pack, a controller configured to perform control such that the power supplied from the external power grid is transmitted to the battery pack via a system and the battery pack is charged with the power, and a main power source configured to supply power to the charger and the controller, wherein the controller determines the operation state of the system and, when the supply of power from the external power grid is impossible, performs control such that the power stored in the battery pack is supplied to the main power source.

The charger may include at least one bidirectional DC/DC converter disposed in the housing, the bidirectional DC/DC converter being configured to supply direct-current power to the at least one battery pack.

In addition, the battery swapping station may include an AC/DC converter connected to the external power grid, the AC/DC converter being configured to convert current.

In addition, the controller may include a main control unit MCU formed between the AC/DC converter and the bidirectional DC/DC converter to generate a control signal and a controller power source for driving.

When the battery of the moving means and the battery for swapping are swapped with each other, the battery for swapping included in the station is included in the moving means to substitute for the battery of the moving means, and the battery of the moving means is included in the station to substitute for the battery for swapping.

The battery of the moving means may be swapped with the battery for swapping through an automatic battery swapping device provided in the station or may be manually swapped with the battery for swapping.

When swapped with the battery for swapping, the battery of the moving means may be charged with power supplied from the system.

In addition, a first DC/DC converter formed between the AC/DC converter and the MCU may be included.

In addition, a second DC/DC converter formed between the MCU and the bidirectional DC/DC converter and the battery pack may be included.

In addition, when the supply of power from the external power grid is interrupted, the MCU may operate the second DC/DC converter to change a current direction of the bidirectional DC/DC converter from the battery pack to the main power source.

In addition, the controller may include a voltage sensing unit configured to determine whether voltage between the first DC/DC converter and the MCU is abnormal.

That is, when the battery of the moving means is included in the station as the result of swapping between the battery of the moving means and the battery for swapping, the battery of the moving means may substitute for the battery for swapping and may be charged with power supplied from the system.

The battery of the moving means that substitutes for the battery for swapping as the result of being included in the station as the battery of the moving means is swapped with the battery for swapping may be controlled by the control unit, in the same manner as the battery for swapping.

In addition, the battery of the moving means that substitutes for the battery for swapping as the result of being included in the station as the battery of the moving means is swapped with the battery for swapping may be discharged to supply the charged power to the system and may be swapped with a battery of another moving means.

In addition, the battery of the moving means may be charged with the energy stored in the plurality of batteries. That is, the battery of the moving means may not be swapped with the battery for swapping and may be charged with the energy stored in the plurality of batteries.

The energy stored in the battery for swapping is first supplied to the battery of the moving means. When it is difficult to charge the battery of the moving means with the energy stored in the battery for swapping, however, the energy stored in the large-capacity battery may be supplied.

The supply of power to the battery of the moving means may be achieved by the control unit controlling charging and discharging of the plurality of batteries.

In addition, a P-FET formed between the second DC/DC converter and the bidirectional DC/DC converter and the battery pack may be included, and when the value of voltage sensed by the voltage sensing unit is 0 V, the controller may perform control such that the P-FET is turned on, whereby the second DC/DC converter is operated to change a current direction of the bidirectional DC/DC converter from the battery pack to the main power source.

In addition, the present invention may provide an electrically driven device including a receiving unit configured to receive identification information of the battery-pack-based battery swapping station and a processor configured to determine whether to communicate with the battery-pack-based battery swapping station based on the identification information received from the battery-pack-based battery swapping station and authentication information.

The MCU may perform control such that, when load power of the system is equal to or greater than a predetermined level as the result of determining the operation state of the system of the battery swapping station, the energy stored in the plurality of batteries is supplied to the system, and when the load power of the system is less than the predetermined level, i.e. when charging of the plurality of batteries through the system is impossible or when operation of the battery swapping station is impossible, power necessary to operate the battery swapping station is supplied from one or more of the batteries.

In an embodiment, the MCU may define a time zone in which the load power of the battery swapping station is maximally consumed, which is a time zone in which power charged in the plurality of batteries is maximally required, as the result of determining the operation state of the battery swapping station as a peak time, may divide a period in which the load power is consumed for each time zone, and may specify the time zone in which the maximum load power has been consumed.

FIG. 3 is a view showing a battery-pack-based battery swapping station in which power management is reflected when the supply of external power is interrupted according to the embodiment of the present invention.

The battery swapping station and the electric vehicle may be connected to each other through short-range communication using Wi-Fi. When the electric vehicle reaches the battery swapping station, Wi-Fi mounted in the battery swapping station and Wi-Fi mounted in the electric vehicle may form a bridge type network.

As the battery swapping station and the electric vehicle are connected to each other through short-range communication, communication connection may be automatically achieved when the electric vehicle is located near the battery swapping station. To this end, the battery swapping station may provide a Wi-Fi network using a fixed local IP. The battery swapping station may open all ports so as to be connected to any electric vehicle. To this end, a DMZ may be set in the battery swapping station.

When the electric vehicle reaches the vicinity of the battery swapping station during driving, therefore, the electric vehicle may be connected to the battery swapping station through short-range communication based on Wi-Fi using a predetermined local fixed IP. For example, all battery swapping stations may be set so as to be connected to an external device through Wi-Fi using the same local fixed IP.

The electric vehicle may check whether the battery swapping station communicatively connected thereto coincides with a target battery swapping station for communication connection, and, when coincidence is achieved, may continuously communicatively connected to the connected battery swapping station.

If the battery swapping station communicatively connected to the electric vehicle does not coincide with a target battery swapping station for communication connection, however, the electric vehicle may perform communication connection with a target battery swapping station through the connected battery swapping station. The battery swapping station may inquire of the server about an IP address of each battery swapping and station, may set communication connection between the target battery swapping station and the electric vehicle based on the result of inquiry.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

100: Housing
200: Charger
210: Controller
300: Main power source
400: External power grid
500: AC/DC converter
600: Bidirectional converter
700: MCU
710: MCU power source
720: Voltage sensing unit
800: First DC/DC converter
900: Second DC/DC converter
910: P-FET

What is claimed is:

1. A battery-pack-based battery swapping station comprising:

an external power grid configured to supply power;

at least one charger configured to charge a battery pack;

a controller configured to perform control such that the power supplied from the external power grid is transmitted to the battery pack and the battery pack is charged with the power;

a main power source configured to supply power to the controller;

a first bidirectional direct-current to direct-current (DC/DC) converter, the first bidirectional DC/DC converter being configured to supply direct-current power to the battery pack;

a first DC/DC converter;

a second DC/DC converter; and an alternating-current to direct-current (AC/DC) converter connected to the external power grid, the AC/DC converter being configured to convert current, wherein the controller includes a main control unit (MCU) that is located between the AC/DC converter and the first bidirectional DC/DC converter, the MCU being configured to generate a control signal, wherein, when the supply of the power from the external power grid is impossible, the controller is configured to perform control such that power stored in the battery pack is supplied to the main power source, and wherein, when the supply of the power from the external power grid is interrupted, the MCU operates the second DC/DC converter to change a current direction of the first bidirectional DC/DC converter from the battery pack to the main power source.

2. The battery-pack-based battery swapping station according to claim 1, wherein the controller further comprises a voltage sensing unit configured to determine whether voltage between the first DC/DC converter and the MCU is abnormal.

3. The battery-pack-based battery swapping station according to claim 1, wherein the second DC/DC converter is located between the MCU and the first bidirectional DC/DC converter and the battery pack.

4. The battery-pack-based battery swapping station according to claim 1, wherein the main power source is configured to supply power to the at least one charger.

5. The battery-pack-based battery swapping station according to claim 1, wherein the first DC/DC converter is located between the AC/DC converter and the MCU.

6. An electrically driven device comprising:

a receiving unit configured to receive identification information of the battery-pack-based battery swapping station according to claim 1; and a processor configured to determine whether to communicate with the battery-pack-based battery swapping station based on the identification information received from the battery-pack-based battery swapping station and authentication information.

7. A battery-pack-based battery swapping station comprising:

an external power grid configured to supply power;

at least one charger configured to charge a battery pack;

a controller configured to perform control such that the power supplied from the external power grid is transmitted to the battery pack and the battery pack is charged with the power;

a main power source configured to supply power to the at least one charger and the controller;

a first bidirectional direct-current to direct-current (DC/DC) converter, the first bidirectional DC/DC converter being configured to supply direct-current power to the battery pack;

a first DC/DC converter;

a second DC/DC converter;

a transistor formed between the second DC/DC converter and the first bidirectional DC/DC converter and the battery pack; and a voltage sensing unit configured to determine whether voltage between the first DC/DC converter and a main control unit (MCU) is abnormal, wherein, when supply of power from the external power grid is impossible, the controller is configured to perform control such that the power stored in the battery pack is supplied to the main power source, and wherein when a value of voltage sensed by the voltage sensing unit is 0 volts (V), the controller is configured to perform control such that the transistor is turned on, whereby the second DC/DC converter is operated to change a current direction of the first bidirectional DC/DC converter.

8. The battery-pack-based battery swapping station according to claim 7, wherein, when the controller is configured to perform control such that the transistor is turned on, the second DC/DC converter is operated to change the current direction of the first bidirectional DC/DC converter from the battery pack to the main power source.

9. The battery-pack-based battery swapping station according to claim 7, wherein the first DC/DC converter is located between an alternating-current to direct-current (AC/DC) converter and the MCU.

10. The battery-pack-based battery swapping station according to claim 9, wherein the main power source is connected to the AC/DC converter, the first DC/DC converter and the battery pack.

11. The battery-pack-based battery swapping station according to claim 7, wherein the second DC/DC converter is located between the MCU and the first bidirectional DC/DC converter and the battery pack.

12. The battery-pack-based battery swapping station according to claim 7, wherein the voltage sensing unit is connected to the transistor, the MCU and the first DC/DC converter.

13. The battery-pack-based battery swapping station according to claim 7, wherein the transistor is a p-channel field-effect transistor (P-FET).

14. The battery-pack-based battery swapping station according to claim 1, further comprising a second bidirectional DC/DC converter configured to supply direct-current power to the battery pack.

15. The battery-pack-based battery swapping station according to claim 14, wherein the first bidirectional DC/DC converter is located between the second bidirectional DC/DC converter and the main power source.

16. The battery-pack-based battery swapping station according to claim 14, wherein the main power source is connected to the first bidirectional DC/DC converter and the second bidirectional DC/DC converter.

* * * * *